United States Patent [19]

Ettischer

[11] 3,887,934
[45] June 3, 1975

[54] PHOTOGRAPHIC SHUTTER
[75] Inventor: Helmut Ettischer, Ruit, Germany
[73] Assignee: Eastman Kodak Company, Rochester, N.Y.
[22] Filed: Jan. 16, 1974
[21] Appl. No.: 433,627

[30] Foreign Application Priority Data
Feb. 8, 1973   Germany............................ 2306056

[52] U.S. Cl. ................ 354/251; 354/250; 354/254; 354/265
[51] Int. Cl. ............................................. G03b 9/14
[58] Field of Search .......... 354/250, 251, 253, 254, 354/261, 265

[56] References Cited
UNITED STATES PATENTS
3,664,252   5/1972   Simon................................ 354/265
3,678,838   7/1972   Huschle et al..................... 354/265

Primary Examiner—Samuel S. Matthews
Assistant Examiner—Russell E. Adams, Jr.
Attorney, Agent, or Firm—T. H. Close

[57] ABSTRACT

A shutter mechanism has first and second blades mounted for movement relative to an exposure aperture of a camera to initiate and terminate an exposure interval. The first blade is spring urged to uncover the exposure aperture and the second blade is spring urged to cover the aperture.

The second blade is adapted to receive an impulse from the first blade which momentarily propels the second blade in a direction away from the aperture. The exposure interval is determined by the amount of travel of the second blade away from the aperture which can be varied via an adjustable rebound stop positioned in the path of the second blade.

4 Claims, 3 Drawing Figures

PHOTOGRAPHIC SHUTTER

BACKGROUND OF THE INVENTION

1. Field of the Invention

This invention relates to camera shutter mechanisms and in particular to shutter mechanisms having spring operated opening and closing blades.

2. Description of the Prior Art

In known shutters of the type having spring operated opening and closing blades, the springs of both blades must be pretensioned before operation of the shutter release. Moreover, to provide a variable exposure time, mechanical, electromagnetic, or other holding or delay means are provided in known shutters for timed release of the closing blade. Due to their inherent complexity such known holding or delay means have attendant problems associated with cost and reliability.

SUMMARY OF THE INVENTION

It is an object of this invention to provide a spring operated twin bladed shutter which is inexpensive to manufacture.

Another object of the invention is to eliminate the need for holding means used with prior shutter mechanisms for holding the closing blade against movement in a shutter closing direction after the shutter opening blade is moved for opening the shutter.

It is a further object of the invention to provide a shutter with an adjustable exposure time.

It is yet another object of the invention to provide a spring operated twin bladed shutter wherein the action of the opening blade pretensions the spring urging the closing blade.

These and other objects and advantages are achieved by one embodiment of the present invention wherein a camera shutter comprises an opening blade which is urged by a spring to uncover an exposure aperture and a closing blade which is urged by a spring to cover the aperture. The opening blade is held in a closed position by a latch. When the latch is released the opening blade uncovers the exposure aperture and the closing blade is propelled in a direction away from the exposure aperture and against the force of its spring. The closing blade is returned by its spring to cover the exposure aperture after the opening blade has cleared the exposure aperture thus terminating the exposure.

In a preferred embodiment of the invention, an adjustable rebound stop is provided. The stop is disposed in the path of the closing blade to determine the distance which the closing blade travels in its movement away from the exposure aperture. The desired exposure time for the shutter is selected by adjusting the position of the stop relative to the closing blade.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Photographic cameras being well known in the art, the present description will be limited to those elements forming part of, or cooperating directly with the present invention, the elements of a camera not shown or described herein being understood to be selected from those known in the art.

Figure 1:
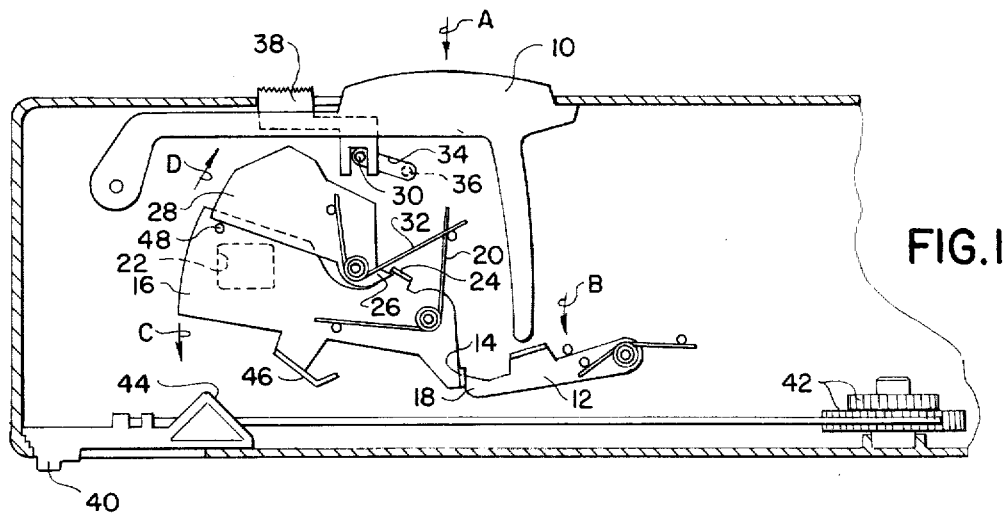
FIG. 1 shows schematically a shutter mechanism constructed in accordance with the present invention, with the elements shown in the cocked position and ready for initiating an exposure.
Figure 2:
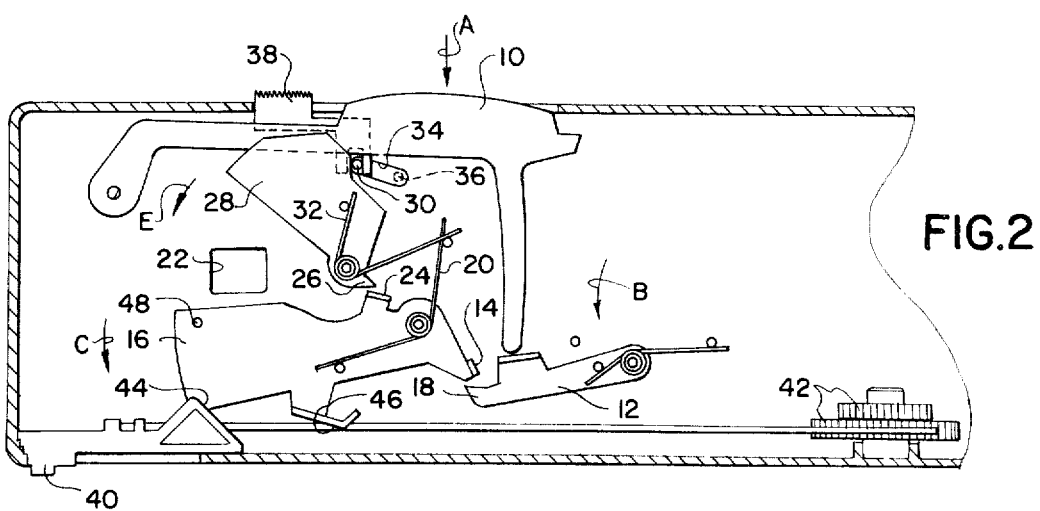
FIG. 2 is a schematic view similar to FIG. 1 but showing the elements during exposure.

Referring now to the drawings, FIG. 1 shows the shutter mechanism in a cocked position ready for an exposure and FIG. 2 shows the shutter mechanism during an opening phase. As best seen by reference to FIG. 1, when a release member 10 is actuated in the direction of arrow A, a pawl 12, disposed in the path of movement thereof, is pivoted in the direction of arrow B and a lug 14 of an opening blade 16 is disengaged from a nose 18 of the pawl 12. The disengagement permits the opening blade 16 to swing in the direction of arrow C, driven by the force of a spring 20, and to clear an exposure aperture 22 to permit the passage of light therethrough.

During movement of the opening blade 16 to uncover the exposure aperture 22, a lug 24 of said opening blade 16 thereby strikes an extension 26 of a closing blade 28, the impact of which spins the closing blade 28 in the direction of arrow D until it reaches an adjustable stop 30. As will be apparent from FIG. 2, at this time in the cycle of operation lug 24 has swung to a position beyond the range of travel of extension 26.

Figure 3:
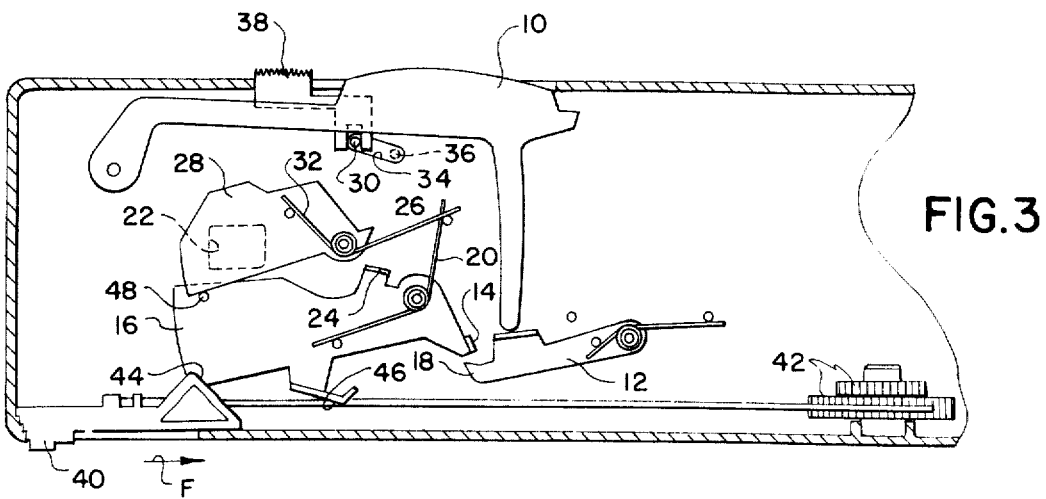
FIG. 3 is a schematic view similar to FIGS. 1 and 2 but showing the elements in an uncocked position after exposure has been terminated.

After striking the adjustable stop 30, the closing blade 28 changes its direction of motion to the direction shown by arrow E in FIG. 2 and returns, urged by spring 32, to cover the exposure aperture 22, i.e. to close the shutter, as shown in FIG. 3. Spring 32 is effectively weaker than spring 20 to allow it to be tensioned by spring 20. The adjustable stop 30 which is associated with the closing blade 28 can be adjusted in a slot 34 so that the length of travel of the closing blade 28 is variable, giving rise to various exposure times. If, for example, the adjustable stop 30 is translated to the point indicated in phantom at 36, a different exposure time results which is longer than the exposure time obtained when stop 30 is at the left end of slot 34 as shown in solid lines in FIGS. 1–3.

In the embodiment illustrated a manually operated adjusting member 38 serves for the displacement of the adjustable stop 30. In addition to, or in substitution for this adjusting member 38, it would be advantageous if the adjusting means provided is operationally connected to the flash device of the camera and, for instance, is effective to automatically place the adjustable stop 30 to a particular position (such as the position 36) when a flashcube is inserted into the flashlamp socket, thereby setting the shutter to the desired flash time in each case, in a simple manner.

After an exposure has been made the camera is cocked by moving a winding slider 40 in the direction of the arrow F as shown in FIG. 3. Movement of the slider in direction F effects rotation of gears 42 for advancing the film in a known manner. At the same time the opening blade is brought into its cocked position as shown in FIG. 1 by means of ramp 44 on the winding slider 40 engaging runner 46 on the opening blade 16.

Projection 48 on opening blade 16 engages closing blade 28, thereby simultaneously returning closing blade 28 to its cocked (FIG. 1) position. Extension 26 of closing blade 28 and/or lug 24 of opening blade 16 are made of flexible or resilient material so that some relative movement between these parts can occur in a direction perpendicular to the plane of the drawings as extension 26 passes lug 24 during cocking of the shutter. The shutter when cocked is ready for the next exposure.

The invention has been described in detail with particular reference to a preferred embodiment thereof, but it will be understood that variations and modifications can be effected within the spirit and scope of the invention.

I claim:

1. In a camera having an exposure aperture, a shutter mechanism comprising:
   an opening blade movable relative to the exposure aperture between a closed position wherein said opening blade covers the aperture and an open position wherein said opening blade uncovers the exposure aperture;
   a first spring coupled with said opening blade urging said opening blade toward its open position;
   a closing blade movable relative to the exposure aperture between an open position wherein said closing blade uncovers the exposure aperture and a closed position wherein said closing blade covers the exposure aperture, a portion of said closing blade defining an impact receiving member;
   means responsive to movement of said opening blade from its closed position toward its open position for striking said impact receiving member of said closing blade to effect movement of said closing blade in a first direction away from its closed position; and
   a second spring coupled with said closing blade for urging said closing blade in a second direction toward its closed position, said second spring being weaker than said first spring.

2. In a camera having an exposure aperture, a shutter mechanism comprising:
   an opening blade movable relative to the exposure aperture between a closed position wherein said opening blade blocks passage of light through the exposure aperture and an open position wherein said opening blade allows passage of light through the exposure aperture, a portion of said opening blade defining an impact member;
   a first spring coupled with said opening blade urging said opening blade toward its open position;
   a closing blade movable relative to the exposure aperture between a range of open positions wherein said closing blade allows the passage of light through the exposure aperture and a closed position wherein said closing blade blocks passage of light through the exposure aperture, a portion of said closing blade defining an impact receiving member disposed in the path of the impact member on said opening blade to receive an impulse from said opening blade when (1) said opening blade moves from its closed position to its open position and (2) said closing blade is in its open position, said opening and closing blades being positioned relative to each other so that the impulse is applied to said closing blade to propel it in a first direction away from the exposure aperture and into its range of open positions; and
   a second spring coupled with said closing blade for urging said closing blade in a second direction toward its closed position, said second spring being weaker than said first spring.

3. A shutter mechanism for covering and uncovering an exposure aperture in a photographic camera, said shutter mechanism comprising:
   an opening blade mounted for pivotal movement and movable between a closed position wherein said opening blade covers the exposure aperture and an open position wherein said opening blade uncovers the exposure aperture, said opening blade having a portion defining a lug;
   a first spring in contact with said opening blade urging said opening blade to an open position;
   latch means engageable with said opening blade when in its closed position, for releasably holding said opening blade in its closed position, said latch means being disengageable from the opening blade for releasing said opening blade for movement from its closed position;
   a closing blade mounted for pivotal movement and movable between a range of open positions wherein said closing blade uncovers the exposure aperture and a closed position wherein said closing blade covers the exposure aperture, a portion of said closing blade extending into the path of movement of said lug portion of said opening blade to receive an impulse from said opening blade when said opening blade moves from its closed position, thereby propelling said closing blade into its range of open positions in a first direction of rotation which is opposite to that of the closing blade;
   a second spring, relatively weaker than said first spring, in contact with said closing blade urging said closing blade in a second direction toward its closed position; and
   cocking means in operative relationship with said opening blade for returning said opening blade to its closed position.

4. A shutter mechanism as set forth in claim 3 further comprising:
   an adjustable stop means engageable by said closing blade for limiting the movement of said closing blade in said first direction, thereby allowing a selection of exposure times.

* * * * *